United States Patent [19]

Johnson

[11] Patent Number: 4,936,284
[45] Date of Patent: Jun. 26, 1990

[54] CONCRETE SAW

[76] Inventor: Jack B. Johnson, 5360 S. Riley La., Murray, Utah 84107

[21] Appl. No.: 264,980

[22] Filed: Oct. 31, 1988

[51] Int. Cl.$^5$ .............................................. B28D 1/08
[52] U.S. Cl. ...................................... 125/21; 51/148; 83/651.1
[58] Field of Search .......................... 51/148, 283 R; 83/651.1, 661, 814, 816; 125/19, 21; 299/35, 63

[56] References Cited

U.S. PATENT DOCUMENTS

| | | | |
|---|---|---|---|
| 3,593,700 | 7/1971 | McNulby | 125/21 |
| 4,181,115 | 1/1980 | Weisner | 125/21 |
| 4,603,678 | 8/1986 | Fish | 125/21 |
| 4,765,307 | 8/1988 | Kubo | 125/21 |
| 4,821,703 | 4/1989 | Kubo | 125/21 X |

FOREIGN PATENT DOCUMENTS 0279305  8/1988  European Pat. Off. .............. 125/21

Primary Examiner—Robert P. Olszewski
Attorney, Agent, or Firm—Thorpe, North & Western

[57] ABSTRACT

A concrete saw includes a track for mounting on the side of a wall or slab which is to be cut, a carriage which, when placed on the track, may be slid along the track, a frame mounted on and projecting outwardly from the carriage, a hydraulic motor mounted on the frame to be selectively moved toward or away from the carriage, and a manually operable mechanism coupled to the motor to cause it to be moved either toward or away from the carriage. The hydraulic motor includes a drive shaft which projects upwardly from the motor and frame. A drive wheel is mounted on the drive shaft of the motor to be rotated when the motor is operated. An elongate cutting cable whose free ends may be joined and unjoined is provided for looping about the wheel and through two spaced-apart openings in a wall to be cut. When the cable is positioned for cutting, the motor is operated to rotate the drive wheel and thus move the cable to cut concrete about which the cable is looped. As cutting takes place, the motor and drive wheel are moved slowly away from the carriage to continue to maintain the cable in a taut condition to facilitate continued cutting of the concrete.

13 Claims, 2 Drawing Sheets

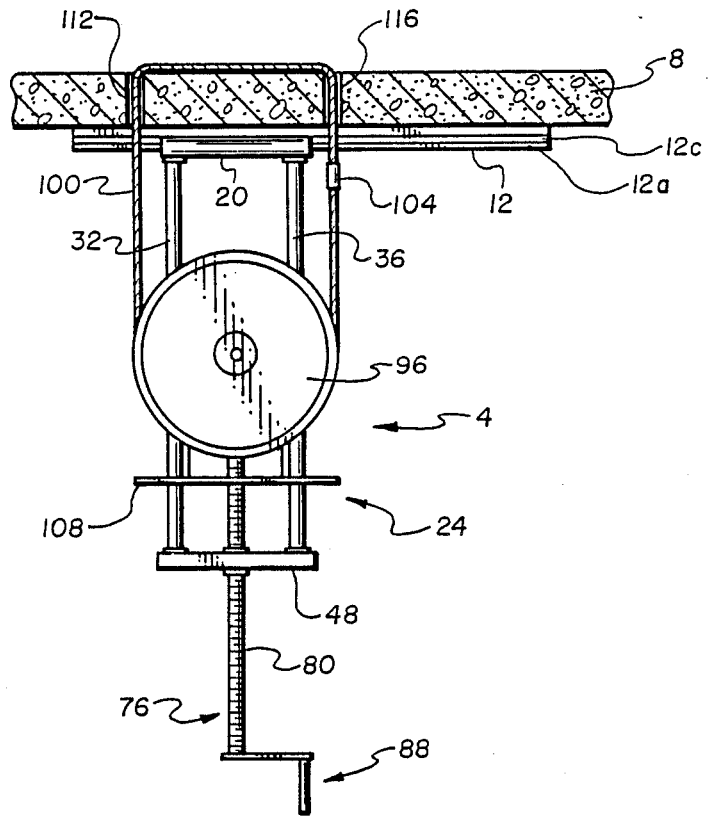

CONCRETE SAW

BACKGROUND OF THE INVENTION

This invention relates to a simple, easy to use, lightweight saw for cutting concrete and the like.

There are a number of prior art arrangements for cutting through concrete walls or slabs including the use of what is called a line drill to bore a series of holes, overlapping, in the wall until the desired cut is made. This is time consuming and tedious since the cutting is essentially performed by boring holes one after the other until the desired length of the cut is achieved.

Another prior art arrangement utilizes a cable formed into a loop and containing cutting elements and threaded through two spaced-apart holes in a wall to be cut and looped about a rotatable wheel. A tension is applied to the cable to put it into intimate contact with the wall separating the two holes and then the wheel is rotated to drive the cable and perform the cutting. The wheel is mounted on the shaft of a motor which, in turn, is carried by a framework which sits on the ground adjacent to the wall to be cut. After the cut is made between the two holes, the apparatus is wheeled or pushed along the ground to the next position where a cutting is to continue. Of course, if the ground adjacent the wall to be cut is uneven, rocky, and generally in a condition other than substantially flat, it can become very difficult to move the apparatus to the next position for cutting.

SUMMARY OF THE INVENTION

It is an object of the invention to provide a concrete saw which is simple in design, lightweight and readily utilized to cut concrete walls or the like.

It is another object of the invention to provide such a saw which may be readily moved from one cutting position to another.

It is still another object of the invention to provide such a saw in which precise cuts can be made in a concrete wall.

It is also an object of the invention to provide such a saw in which a concrete wall or slab may be readily cut regardless of the condition of the ground adjacent to the wall or slab.

The above and other objects of the invention are realized in a specific illustrative embodiment of apparatus for cutting a concrete or similar structure, said apparatus including an elongate track mountable on the side of the wall or slab, a carriage element mountable on the track to slide therealong, a frame mounted on the carriage element to project outwardly therefrom and from the wall, a driving mechanism and drive wheel mounted on the frame to be selectively moved toward or away from the carriage element, and an elongate cutting cable connectable together at its ends to form a loop which is fitted about the wheel and through two holes cut in the wall. The driving mechanism may be operated to rotate the drive wheel and thereby move the cutting cable and, as this is done, a manually operable mechanism mounted on the frame may be operated to move the driving mechanism and drive wheel away from the carriage element and wall to tighten the cutting cable and bring it into more intimate contact with the wall to facilitate the cutting. As cutting takes place in the tautness of the cable is relieved, the manually operable mechanism may again be operated to move the driving element and drive wheel away from the wall to again tighten the cutting cable; this process is repeated until the desired cut is concluded. After which time the frame and carriage element may be slid along the track to the next cutting position where the previously described process may be repeated.

BRIEF DESCRIPTION OF THE DRAWINGS

The above and other objects, features and advantages of the invention will become apparent from a consideration of the following detailed description presented in connection with the drawings in which:

FIG. 3 is a top, plan view of the concrete saw of FIG. 1.

DETAILED DESCRIPTION

Figure 1:
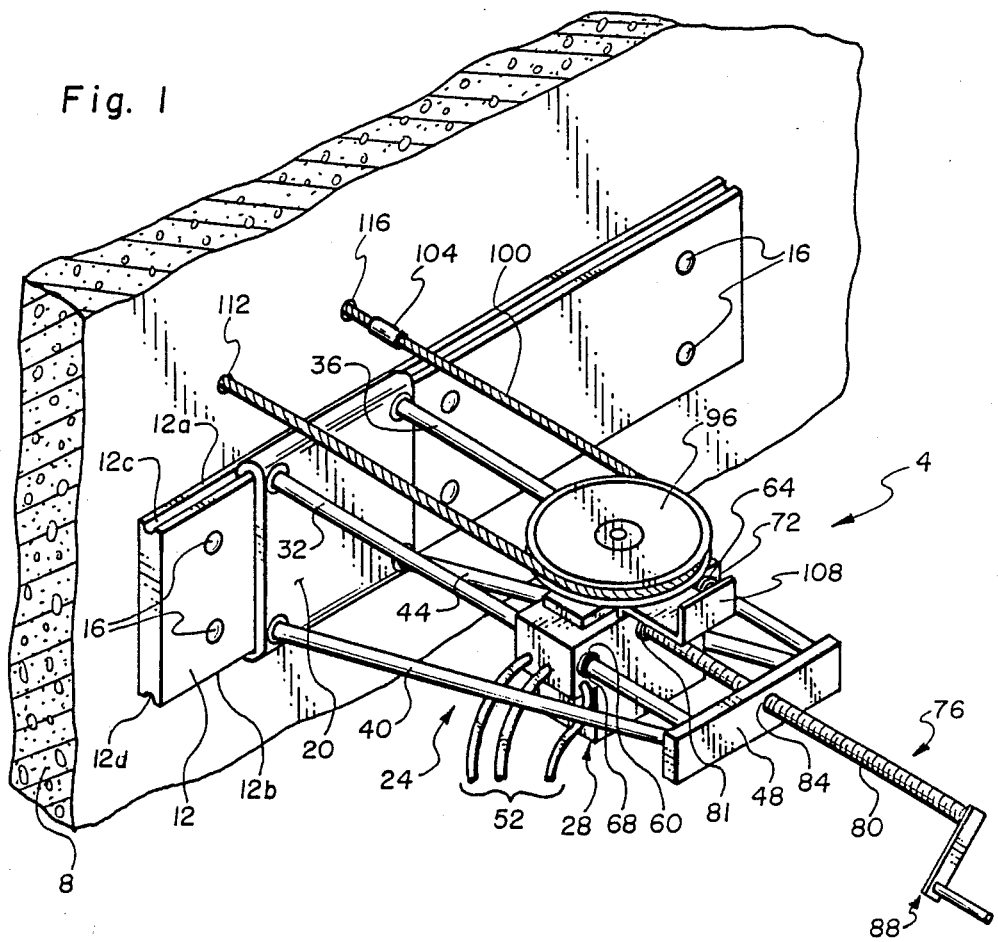
FIG. 1 shows a perspective view of a concrete saw made in accordance,, t principles of the present invention.

Referring to the drawings, there is shown a concrete saw 4 mounted for cutting a concrete wall 8. The saw 4 is mounted on one side of the wall 8 by first mounting a track 12 in the form of an elongate plank, made of steel, other hard metal, or alloy, and having generally parallel opposite sides 12a and 12b. The track 12 is mounted to be generally horizontal on the wall 8, (although other orientations are possible) using concrete bolts 16. Formed in the top edge 12a and bottom edge 12b of the plank 12, are grooves 12c and 12d respectively. These grooves are for receiving and holding a carriage element of the concrete saw 4 to be discussed momentarily.

Figure 2:
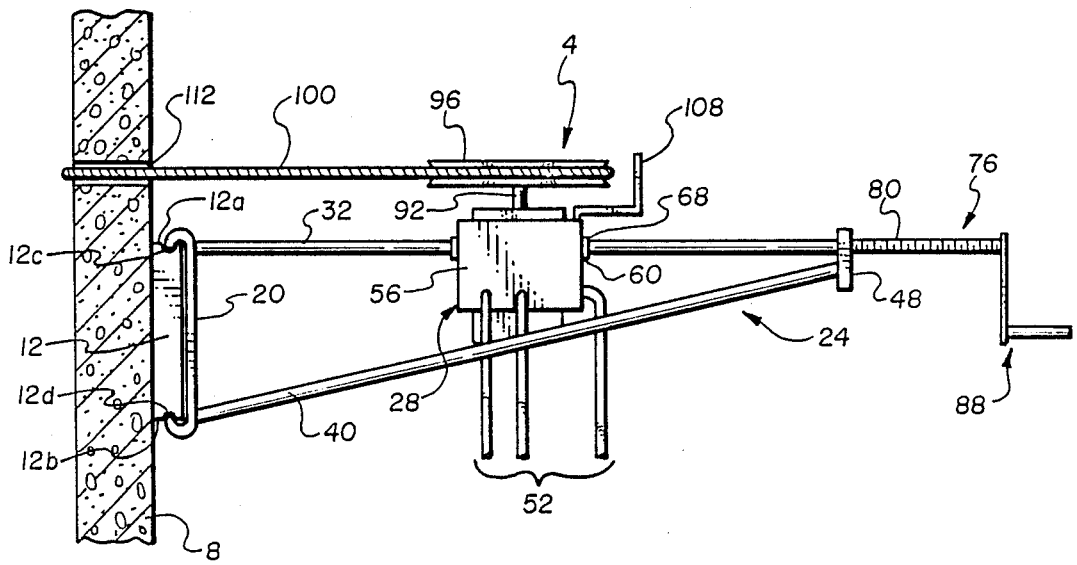
FIG. 2 is a side, elevational view of the concrete saw of FIG. 1.

After the track 12 has been mounted on the wall 8, the concrete saw 4 is then installed or mounted on the track to enable sliding the saw horizontally along the track. This is facilitated by provision of a carriage plate 20. The top and bottom edges of the plate 20 are curved forwardly and inwardly to fit into respective grooves 12c and 12d of the track 12, as best seen in FIG. 2. The carriage plate 20 would be mounted on the track 12 by simply sliding it onto the track at one end with the curved edges of the plate positioned in respective grooves. Once positioned on the track, the plate 20 may be moved laterally or horizontally along the track but can not be pulled outwardly off of the track.

A framework 24 is mounted on the carriage plate 20 to support a motor 28 to be described later. A pair of rails 32 and 36 are attached at one end to the carriage plate 20 to extend outwardly and normally thereto in a generally parallel relationship. Rail 32 is affixed to the plate near one upper side corner thereof and rail 36 is affixed to the plate at the other upper side corner, as shown. The rails 32 and 36 may be welded to the plate, using conventional anchors, or the like. The frame 24 also includes a pair of braces 40 and 44, also extending outwardly from the plate 20. Base 40 is affixed to the plate 20 at one lower corner of the plate while the other brace 44 is affixed to the plate at the other lower corner as shown, again by conventional welding, use of anchors, etc. The braces 40 and 44 extend outwardly in a generally parallel relationship and upwardly toward the ends of the rails 32 and 36 where they terminate and are affixed in a bracket 48. The rails 32 and 36 are likewise affixed to the bracket 48. Again, the rails 32 and 36 and braces 40 and 44 could be affixed in the bracket 48 by welding or other common affixing method. The brace 48 maintains the rails 32 and 36 and braces 40 and 44 in a generally parallel relationship necessary to enable sliding the motor 28 forwardly and rearwardly on the rails.

The motor 28 is a conventional hydraulic motor powered with hydraulic fluid supplied via lines 52 from a source not shown. The motor 28 is contained in a housing 56 in which are formed a pair of spaced-apart generally parallel bores 60 and 64. Disposed in the bores 60 and 64 are bushings 68 and 72 respectively. The rails 32 and 36 extend through bushings 68 and 72 respectively to support the housing 56 and motor 28. The housing 28 may take a variety of shapes and sizes and the motor 28 could be electric or pneumatic, as well as hydraulic.

The housing 56 may be moved toward or away from the plate 20 on the rails 32 and 36 by operating a crank 76. The crank 76 includes a threaded shank 80 which is screwed into a threaded opening 84 of the bracket 48. Attached to the outer end of the shaft 80 is a crank handle 88 for manually grasping and turning the shaft. The other end of the shaft 80 is mounted in the housing 56 to freely rotate. For example, the end of the shaft 80 could be journaled to rotate within a conventional hollow cylindrical bearing 81. With this arrangement, when the crank handle 88 is rotated in one direction, the shaft 80 is caused to move towards the plate 20 to push the housing 56 toward the plate, and when rotated in the other direction, the shaft 80 is caused to move away from the plate 20 and pull the housing 56 likewise away from the plate.

The hydraulic motor 28 includes a drive shaft 92 on which is mounted a drive wheel 96 (FIG. 2). When the motor is operated, the drive shaft 92 rotates to cause the drive wheel 96 to likewise rotate.

The concrete saw 4 also includes an elongate cutting cable 100 whose ends may be joined together and unjoined by a coupler 104. The coupler 104 may be a solid cylindrical coupler into each end of which a respective cable end is inserted, with the coupler then being crimped to hold the cable together. Alternatively, a screw tube coupler could be used. Both couplers are well known. The cable is advantageously constructed of twisted stainless steel strands on which are threaded diamond beads. The stands are crimped, after the diamond beads are put in place, to prevent the beads from sliding along the strands during the cutting process. This is conventional for concrete cutting tools.

Finally, a guard plate 108 is mounted on a housing 56 to extend in front of the drive wheel 96 as shown in the drawings. During the cutting process, water would typically be squirted onto the cable 100 to control both concrete dust and the temperature of the cable and the guard plate 108 prevents water spun off the wheel from reaching a person operating the crank 76.

In operation, the track 12 would first be mounted on a wall slab to be cut, just below the location where the cut is to be made. Then, the carriage plate 20 with frame 24 and motor 28 are mounted on the track 12 to slide therealong. Two holes 112 and 116 are then bored in the wall 8 along the line to be cut in the wall. The cable 100, with ends uncoupled, is threaded through the holes 112 and 116 and looped about the wheel 96, and the ends are then coupled by coupler 104. The crank 76 is then operated to pull the housing 56 and motor 28 outwardly from the carriage plate 20 until the cable 100 is taut. Then, the motor 28 is operated to cause the drive wheel 96 to rotate and thus move the cable 100 to begin cutting the concrete. As the cutting proceeds, the cable becomes more slack due to the cut made in the wall 8 and the crank 76 would again be operated to move the motor further away from the plate 20 to again make the cable taught. This process is repeated until the desired cut is made through the wall after which the carriage plate 20 would be slid along the track 12 to the next position, holes would be made in the wall at the desired locations, and the cable 100 would be threaded through the holes and about the drive wheel in preparation for making the next cut.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A concrete saw for cutting sections of a concrete wall, slab or the like comprising
    an elongate track mountable on a side of the wall for receiving and holding a carriage means,
    a carriage means mountable on the track to slide therealong but to be held from moving outwardly therefrom,
    a frame mounted on the carriage means to project outwardly therefrom and from the wall,
    drive means mounted on the frame to be selectively moved toward or away from the carriage means,
    a drive wheel mounted to be rotated by and moveable with the drives means,
    an elongate cutting cable connectable together at its ends to form a loop for use, when threaded through two spaced-apart bores in the wall and about the wheel, in cutting the concrete wall located between the two bores, and
    means manually operable to move the drive means and drive wheel toward or away from the carriage means.

2. A saw as in claim 1 wherein said track comprises an elongate plank having generally parallel side edges, each formed with a groove which extends substantially the length of the plank, and wherein said carriage means comprises a plate having a pair of generally parallel, opposite edges, each curved to be received in a corresponding groove of the track to enable sliding the plate along the plank while retaining the plate on the plank.

3. A saw as in claim 2 wherein said frame includes a pair of generally parallel rails extending outwardly from the plate generally normal thereto, and wherein said drive means is mounted to slide on the rails toward or away from the plate.

4. A saw as in claim 3 wherein said rails are mounted to extend outwardly from the plate near one of the side edges, and wherein said frame further includes one or more braces extending outwardly from the plate near the other of the side edges.

5. A saw as in claim 4 wherein said manually operable means includes
    a bracket attached to the outer ends of the rails and brace, said bracket including a threaded opening, and
    a crank having an elongate, threaded shank screwable into the threaded opening and rotatably mounted at one end to the drive means, and a crank handle mounted on the other end of the shank to enable rotating the shank in one direction to cause the shank to screw outwardly away form the bracket to thereby pull the drive means on the rails away from the plate, and in the other direction to cause the shank to screw inwardly toward the bracket to thereby push the drive means on the rails toward the plate.

6. A saw as in claim 1 wherein said drive means incudes a motor with drive shaft on which the drive wheel is mounted.

7. A saw as in claim 6 wherein the motor comprises a hydraulic motor.

8. A saw as in claim 6 wherein the motor comprises an electric motor.

9. A saw as in claim 6 wherein said drive wheel is mounted in a plane generally parallel to the elongate track.

10. A saw as in claim 1 further including a guard plate mounted on the drive means at the side of the drive wheel fartherest from the carriage means, to block water or other liquid from being thrown by the drive wheel past the guard plate.

11. A method of cutting a concrete wall slab or the like comprising the steps of
   (a) mounting an elongate track on one side of the wall,
   (b) placing a carriage on the track to slide therealong but held from moving outwardly therefrom, the carriage mounting a cutting tool, said cutting tool including an elongate cutting cable joinable at its ends to form a loop, and a driveably rotatable wheel about which the cable may be fitted,
   (c) boring two spaced-apart holes in the wall above the track,
   (d) threading the cutting cable through the two holes and about the wheel and joining the ends of the cable together,
   (e) operating the cutting tool to cause the wheel to rotate and thereby cause movement of the cable through the holes, and
   (f) selectively moving the wheel away from the wall during operation of the tool.

12. A method as in claim 11 further comprising the steps of
   (g) sliding the carriage and cutting tool along the track to another position for cutting the wall and repeating steps (c) through (f).

13. A method as in claim 11 further comprising the steps of
   (h) removing the carriage and cutting tool from track,
   (i) dismounting and remounting the track at another location on the wall,
   (j) placing the carriage and cutting tool on the track, and
   (k) repeating steps (c) through (f).

* * * * *